A. F. STOUT.
Grinding-Mills.

No. 156,606.

2 Sheets--Sheet 1.

Patented Nov. 3, 1874.

WITNESSES
Henry N. Miller
C. L. Everit

INVENTOR
Arnold F. Stout,
per
Alexander Mason
Attorneys

2 Sheets--Sheet 2.

A. F. STOUT.
Grinding-Mills.

No. 156,606.

Patented Nov. 3, 1874.

WITNESSES
Henry N. Miller
C. L. Evert.

INVENTOR
A. F. Stout,
per
Alexander & Mason
Attorneys

UNITED STATES PATENT OFFICE.

ARNOLD F. STOUT, OF MONMOUTH JUNCTION, NEW JERSEY.

IMPROVEMENT IN GRINDING-MILLS.

Specification forming part of Letters Patent No. 156,606, dated November 3, 1874; application filed October 13, 1874.

*To all whom it may concern:*

Be it known that I, ARNOLD F. STOUT, of Monmouth Junction, in the county of Middlesex and in the State of New Jersey, have invented certain new and useful Improvements in Feed-Mill Plates; and do hereby declare that the following is a full, clear, and exact description thereof, reference being had to the accompanying drawings, and to the letters of reference marked thereon, making a part of this specification.

My invention relates to mills for grinding feed; and it consists in providing the grinding-plates with ears in the center of the plate, which ears extend inward into the eye, as will be hereinafter more fully set forth.

In order to enable others skilled in the art to which my invention appertains to make and use the same I will now proceed to describe its construction and operation, referring to the annexed drawings, in which—

Figure 1:
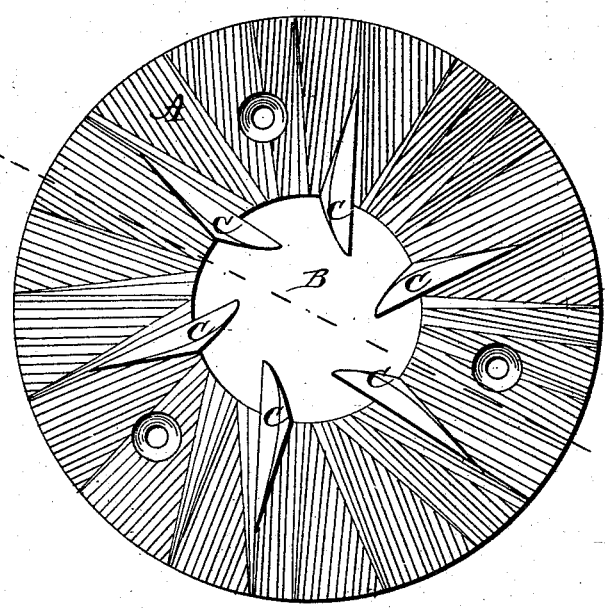
Figure 2:
Figure 3:
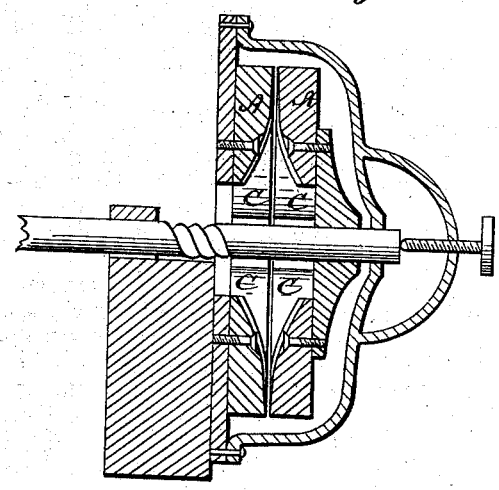

Figure 1 is an elevation of a feed-mill plate embodying my invention. Fig. 2 is a longitudinal section of the same, and Fig. 3 is a vertical section of a feed-mill embodying my invention.

A represents a stationary or revolving cast-iron feed-mill plate, made slightly beveled and convex on its grinding-surface from the outer edge to the central eye B, and this surface dressed in any of the known and usual ways. On the grinding-surface of the plate A is formed a series of ears or teeth, C C, at equal distances apart, which ears or teeth extend inward into the eye B, and receive the material in small quantities. The ears C do not run radially—that is, not on a line with the center of the stone, but on the side thereof, at angles to the radiuses, and are of equal thickness, or thereabout, with the outer edge of the plate. These ears or teeth in the center of the plate will carry in the feed regular and in small quantities, and keep it from coming back to the entrance or choking by cobs or straw, and by these ears it will enable the grain to be forced in, so that almost any power can be brought to a stand.

In operation, one of the plates, as constructed, is stationary upon the frame-work, while a plate of similar construction is connected to a shaft or mandrel, which passes through the eye of the stationary plate, and revolves with the rotating plate. As the material to be crushed is fed through the eye of the stationary plate it is caught by the ears C, and kept from being thrown back to the center of the eye or to the shaft. The material is caught by one of the ears and held in its rotary motion until more material is brought against it and driven forward by the continuous feed of the material to the operating parts.

Having thus fully described my invention, what I claim as new, and desire to secure by Letters Patent, is—

The combination, with the plate A having eye B, and beveled from its periphery to said eye, of the ears C C, attached to or formed with the plate at an angle to the radiuses, and projecting within the eye to carry the feed regular, and prevent its backward movement and choking, as set forth.

In testimony that I claim the foregoing I have hereunto set my hand this 3d day of October, 1874.

ARNOLD F. STOUT.

Witnesses:
JACOB S. WOOLF,
MARCEL RUNYON.